(12) United States Patent
Fukui

(10) Patent No.: US 7,562,604 B2
(45) Date of Patent: Jul. 21, 2009

(54) BICYCLE CHAIN WHEEL STRUCTURE

(75) Inventor: Seiji Fukui, Shimonoseki (JP)

(73) Assignee: Shimano Inc., Osaka (JP)

( * ) Notice: Subject to any disclaimer, the term of this patent is extended or adjusted under 35 U.S.C. 154(b) by 91 days.

(21) Appl. No.: 10/878,499

(22) Filed: Jun. 29, 2004

(65) Prior Publication Data

US 2005/0284252 A1 Dec. 29, 2005

(51) Int. Cl.
B62M 3/00 (2006.01)
(52) U.S. Cl. .................................. 74/594.1; 74/594.2
(58) Field of Classification Search ............... 74/594.1, 74/594.2; 384/545, 458; 474/144; 403/1
See application file for complete search history.

(56) References Cited

U.S. PATENT DOCUMENTS

| 648,077 | A | * | 4/1900 | Ludlow | 403/24 |
| 1,337,765 | A | * | 4/1920 | McGuckin | 403/355 |
| 3,906,811 | A | * | 9/1975 | Thun | 74/594.1 |
| 4,300,411 | A | * | 11/1981 | Segawa | 74/594.2 |
| 4,358,967 | A | * | 11/1982 | Kastan | 74/594.2 |
| 4,418,584 | A | * | 12/1983 | Shimano | 74/594.2 |
| 4,439,172 | A | * | 3/1984 | Segawa | 474/160 |
| 4,457,424 | A | * | 7/1984 | Wuensch | 198/747 |
| 4,487,424 | A | * | 12/1984 | Ellis | 280/304.3 |
| 5,335,928 | A | | 8/1994 | Pong et al. | |
| 5,609,070 | A | * | 3/1997 | Lin et al. | 74/594.1 |
| 6,199,449 | B1 | * | 3/2001 | Harrington | 74/594.1 |
| D446,169 | S | * | 8/2001 | Masui | D12/123 |
| 6,367,352 | B1 | * | 4/2002 | Niculescu | 74/594.1 |
| 6,475,110 | B1 | * | 11/2002 | Yamanaka | 474/152 |
| 2001/0049976 | A1 | | 12/2001 | Dodman | |
| 2003/0097901 | A1 | | 5/2003 | Yamanaka | |

* cited by examiner

*Primary Examiner*—Marcus Charles
*Assistant Examiner*—James Pilkington
(74) *Attorney, Agent, or Firm*—Global IP Counselors, LLP

(57) ABSTRACT

A bicycle chain wheel structure is configured with a right crank arm portion and an axle portion that are integrally formed together as a one-piece, unitary member. The right crank arm portion has an inner end integrally formed with the axle portion. The right crank arm portion has an outer end with a pedal mounting arrangement. The axle portion has a first end that is integrally formed with the right crank arm portion and a second end with a crank arm mounting arrangement. The axle portion has external threads disposed between the first and second ends of the axle portion. Thus, a portion of a bottom bracket is partially integrated into the bicycle chain wheel structure. Preferably, the chain guard is integrated into the right crank arm as a one-piece, unitary member. This arrangement reduces parts and manufacturing costs of the bicycle chain wheel structure.

19 Claims, 5 Drawing Sheets

BICYCLE CHAIN WHEEL STRUCTURE

BACKGROUND OF THE INVENTION

1. Field of the Invention

This invention generally relates to a bicycle chain wheel structure. More specifically, the present invention relates to a bicycle chain wheel structure that is integrated with part of the bottom bracket structure.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to make the bicycle easier to assemble and more affordable to purchase.

One particular portion of a bicycle that has been extensively redesigned over the past years is the drive train of the bicycle. A bicycle drive train typically has a chain that interconnects one or more front chain wheels to one or more sprockets mounted on the rear wheel. The front chain wheels are mounted on the bicycle frame by a bottom bracket that has a crank arm axle that rotates relative to the bicycle frame. Each end of the crank arm axle has a crank arm fixed thereto for rotating the crank arm axle relative to the bicycle frame. The crank arms extend outwardly from the bottom bracket in opposite directions and have pedals attached to their free ends for supporting the rider's feet. The front chain wheels are typically attached to the right crank arm to rotate therewith. Rotation of the pedals by the rider causes the chain wheels to rotate which in turn moves the bicycle chain to rotate the rear sprockets, and thus, rotate the rear wheel of the bicycle. In certain crank arm designs, the front chain wheels are coupled directly to the crank arm by fastening finger portions. The fastening finger portions are coupled to the hub portion of the crank arm, and extend radially outwardly from the hub portion of the crank arm.

One problem with these types of drive trains is that they include numerous parts. Accordingly, the front chain wheel structure is often very complex structure, which can be time consuming to assembly. Thus, these conventional structures can result in the bicycle being more expensive due to the increase costs involved in manufacturing and assembling all of the individual parts.

Another problem with these types of drive trains is that the rider's clothing can either get caught in-between the chain and the chain wheels, or the rider's clothing can become dirty from contacting these chains. To overcome these problems, bicycle manufactures have provided a protective cover or guard for the driving sprocket of a bicycle. Usually, such covers or guards are separate members that are attached to the right crank arm or one of the chain wheels. For example, some protective covers or chain guards are fixed to the front chain wheel by bolts extending in a direction relatively parallel to the axis of rotation of the chain wheel. Many protective covers or chain guards are made of a thin metal material or some plastic material.

In view of the above, it will be apparent to those skilled in the art from this disclosure that there exists a need for an improved bicycle chain wheel structure. This invention addresses this need in the art as well as other needs, which will become apparent to those skilled in the art from this disclosure.

SUMMARY OF THE INVENTION

One object of the present invention is to provide a bicycle chain wheel structure relatively few parts.

Another object of the present invention is to provide a bicycle chain wheel structure that relatively simple and inexpensive to manufacture and assembly.

The foregoing objects can basically be attained by providing a bicycle chain wheel structure that comprises a right crank arm portion and an axle portion. The right crank arm portion has a pedal mounting arrangement. The axle portion has a first end that is integrally formed with the right crank arm portion as a one-piece, unitary member and a second end with a crank arm mounting arrangement. The axle portion has external threads disposed between the first and second ends of the axle portion.

In accordance with one aspect of the present invention, the bottom bracket is partially integrated into the right crank arm as a one-piece, unitary member. This arrangement reduces parts and manufacturing costs of the bicycle chain wheel structure.

In accordance with another aspect of the present invention, the chain guard is integrated into the right crank arm. This arrangement further reduces parts and manufacturing costs of the bicycle chain wheel structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
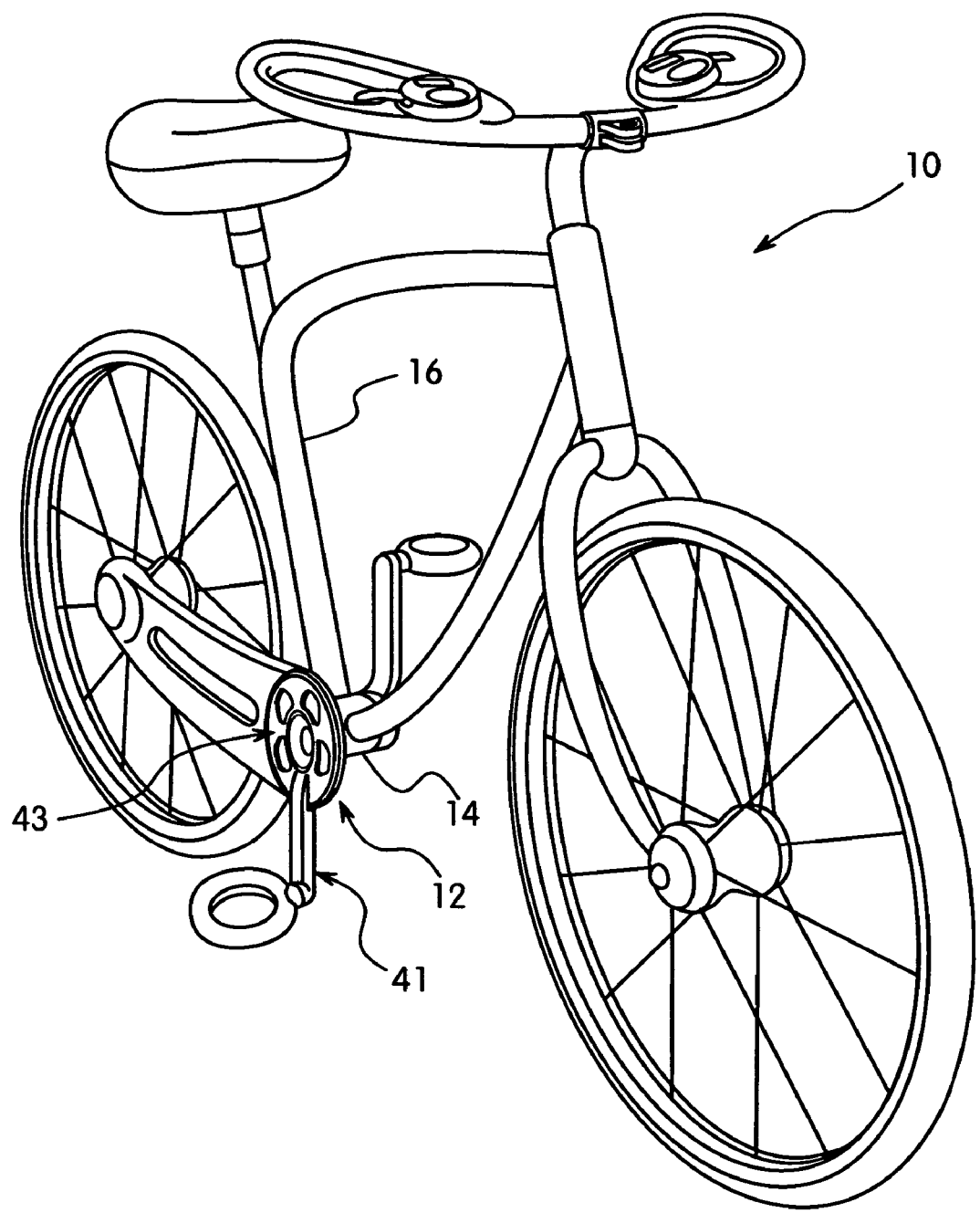
FIG. 1 is a perspective view of a bicycle with a bicycle chain wheel structure in accordance with a first embodiment of the present invention.
Figure 2:
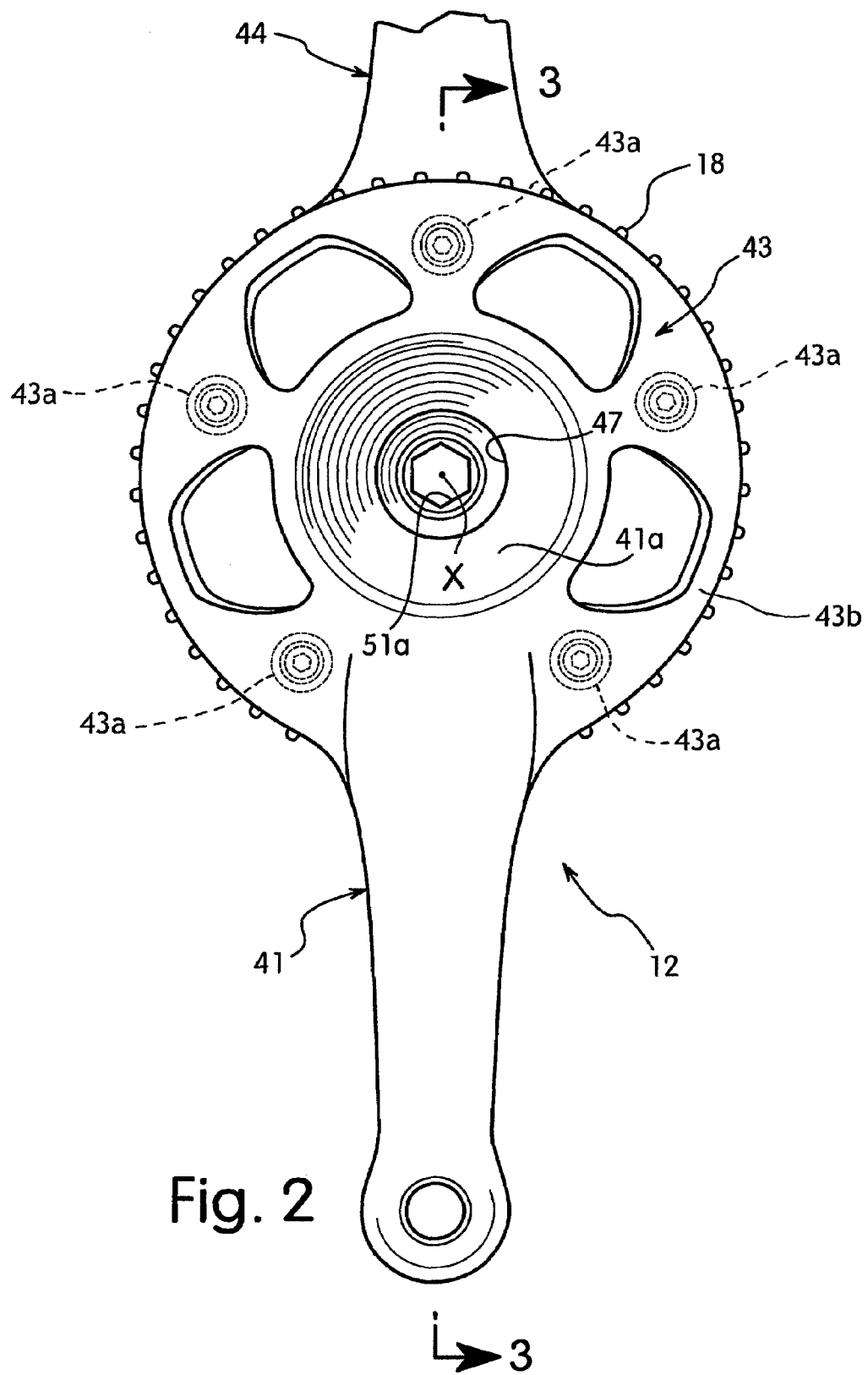
FIG. 2 is an enlarged, right side elevational view of the bicycle chain wheel structure illustrated in FIG. 1 in accordance with the first embodiment of the present invention.
Figure 3A:
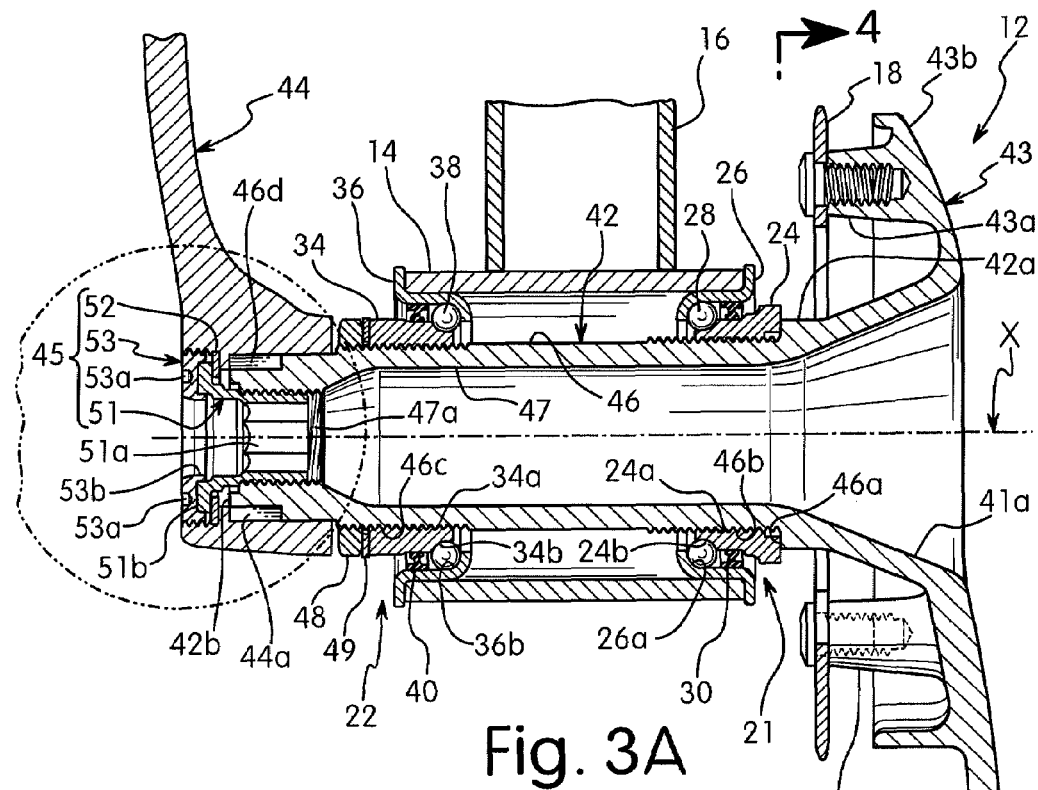
FIG. 3A is a partial longitudinal cross-sectional view of the bicycle chain wheel structure illustrated in FIGS. 1 and 2 as seen along section line 3-3 of FIG. 2.

Referring initially to FIGS. 1-3A, a bicycle 10 is illustrated with a bicycle chain wheel structure 12 in accordance with a first embodiment of the present invention. The chain wheel structure 12 includes an integrated bottom bracket structure as explained below. The chain wheel structure 12 is mounted in a bottom bracket tube 14 of a bicycle frame 16 such that the chain wheel structure 12 can rotate within the bottom bracket tube 14. In particular, as seen in FIG. 3A the chain wheel structure 12 is mounted in a bottom bracket tube 14 by a first bearing unit 21 and a second bearing unit 22. The first and second bearing units 21 and 22 constitute first and second rotatable mounting structures. The chain wheel structure 12 supports at least one chain wheel 18. While only one chain wheel 18 is illustrated, it will be apparent to those skilled in the art from this disclosure that more than one chain wheels of different sizes can be installed as a cluster of chain wheels without departing from the present invention.

As best in seen in FIG. 3A the first bearing unit 21 preferably includes a right cone 24, a right cup 26, a plurality of ball bearings 28 and a right end seal 30. The right cone 24, the right cup 26 and the ball bearings 28 are each constructed of a hard rigid material that is conventionally used in the bicycle art.

The right cone 24 is a tubular member with internal threads 24a and an annular concaved bearing surface 24b that rotatably supports the ball bearings 28. The right cup 26 is fixedly mounted to the bottom bracket tube 14 via a press fit or threaded. The right cup 26 is a tubular member with an annular concaved bearing surface 26a that rotatably supports the ball bearings 28. Accordingly, the ball bearings 28 are circumferentially arranged and rotatably supported between the bearing surfaces 24b of the right cone 24 and the bearing surface 26a of the right cup 26 such that the chain wheel structure 12 can rotate relative to the bottom bracket tube 14. The seal 30 is preferably mounted between the opposing surfaces of the right cone 24 and the right cup 26. Preferably, the seal 30 is constructed of a flexible, resilient seal type material such as an elastomeric material.

The second bearing unit 22 preferably includes a left cone 34, a left cup 36, a plurality of ball bearings 38 and a left end seal 40. The left cone 34, the left cup 36 and the ball bearings 38 are each constructed of a hard rigid material that is conventionally used in the bicycle art.

The left cone 34 is a tubular member with internal threads 34a and an annular concaved bearing surface 34b that rotatably supports the ball bearings 38. The left cup 36 is fixedly mounted to the bottom bracket tube 14 via a press fit or threaded. The left cup 36 is a tubular member with an annular concaved bearing surface 36a that rotatably supports the ball bearings 38. Accordingly, the ball bearings 38 are circumferentially arranged and rotatably supported between the bearing surfaces 34b of the left cone 34 and the bearing surface 36a of the left cup 36 such that the chain wheel structure 12 can rotate relative to the bottom bracket tube 14. The seal 40 is preferably mounted between the opposing surfaces of the left cone 34 and the left cup 36. Preferably, the seal 40 is constructed of a flexible, resilient seal type material such as an elastomeric material.

Figure 5:
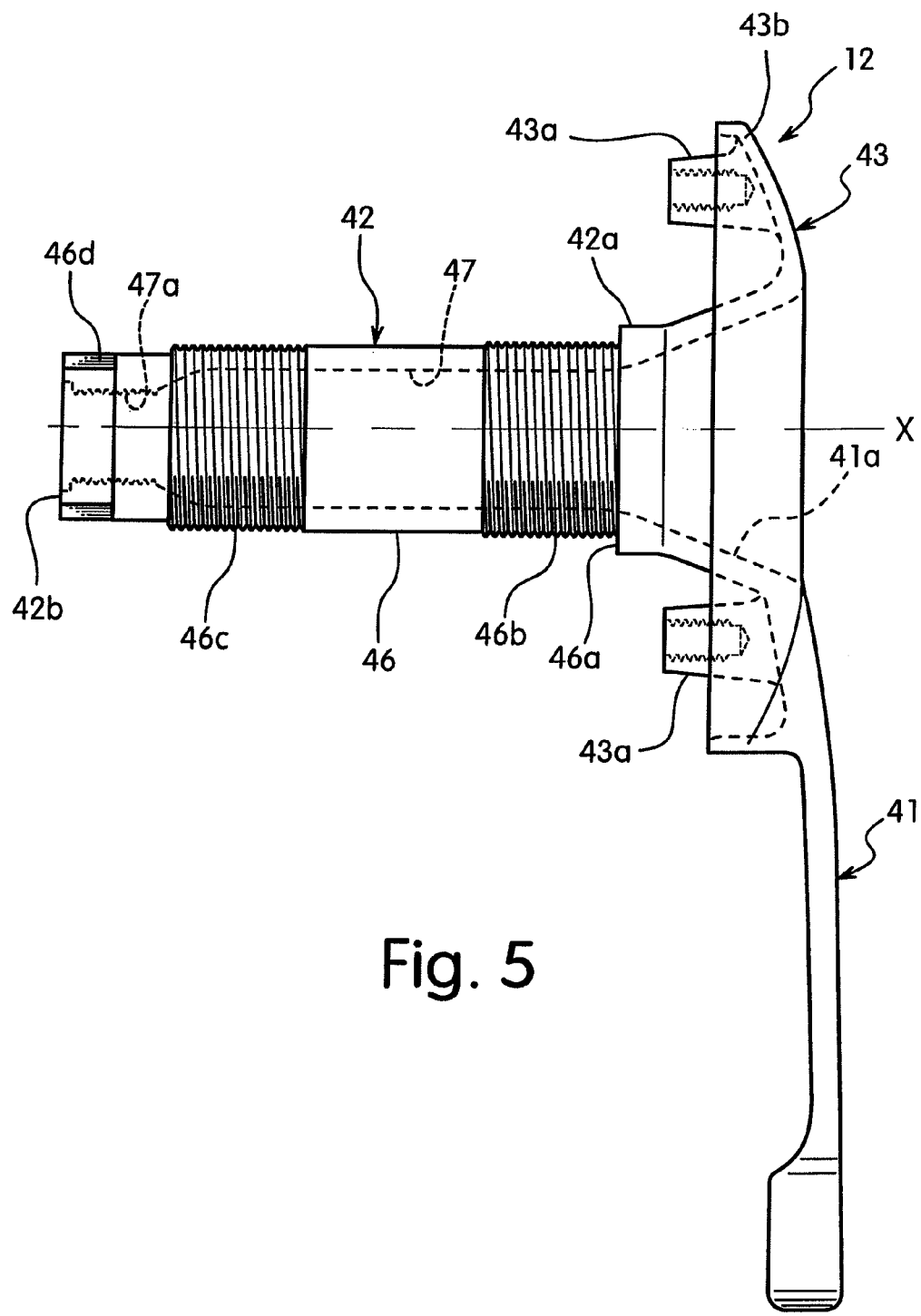
FIG. 5 is a rear side elevational view of the bicycle chain structure in accordance with a first embodiment of the present invention.

As best in seen in FIGS. 3A and 5, the chain wheel structure 12 basically includes a right crank arm portion 41, an axle portion 42, a chain guard portion 43, a left crank arm portion 44 and a left crank arm fastening arrangement 45. The right crank arm portion 41, the axle portion 42 and the chain guard portion 43 are integrally formed as a one-piece, unitary member from a hard rigid material that is conventionally used in the bicycle art. Preferably, the right crank arm portion 41, the axle portion 42 and the chain guard portion 43 are integrally formed from a lightweight metallic material.

The right crank arm portion 41 has an inner end 41a that is integral with the axle portion 42 and an outer free end 41b that has a pedal mounting arrangement 41c. Preferably, the pedal mounting arrangement 41c is a threaded bore that threadedly receives a pedal shaft of a pedal in a conventional manner.

The axle portion 42 is a hollow tubular member having a right or first attached end 42a and a left or second free end 42b. The right attached end 42a is integrally formed with the inner end 41a of the right crank arm portion 41. The left free end 42b is provided with a crank arm mounting arrangement 42c for fixedly coupling the left crank arm portion 44 in a releasable manner using the left crank arm fastening arrangement 45.

The axle portion 42 has a tubular outer peripheral surface 46 and a tubular inner peripheral surface 47. The outer peripheral surface 46 has an inner annular abutment surface 46a, a first set of external threads 46b, a second set of external threads 46c and a plurality of serrations or splines 46d. The inner peripheral surface 47 has a set of internal threads 47a disposed at the left free end 42b of the axle portion 42.

The outer peripheral surface 46 of the axle portion 42 is further configured and arranged to accommodate the first and second bearing units 21 and 22 that constitute first and second rotatable mounting structures for securing the axle portion 42 to the bottom bracket tube 14. The inner annular abutment surface 46a and the first external threads 46b are located adjacent the right attached end 42a of the axle portion 42. The right cone 24 has its internal threads 24a that are configured and arranged to threadedly engage the first external threads 46b. The inner annular abutment surface 46a is disposed adjacent the right end of the first set of external threads 46b for stopping movement of the right cone 24 on the axle portion 42. The effective outer diameter of the first external threads 46b is preferably larger than the effective outer diameter of the second external threads 46c such that the right cone 24 can move freely over the second external threads 46c without interference. In particular, the outer peripheral surface 46 of the axle portion 42 is a step-shaped arrangement with the largest diameter or width being formed at the right attached end 42a of the axle portion 42 and the smallest diameter or width being formed at the left free end 42b of the axle portion 42. Thus, the outer peripheral surface 46 of the axle portion 42 that includes the portion of the axle portion 42 to the right of the inner annular abutment surface 46a has the largest diameter or width, while the portion of the outer peripheral surface 46 of the axle portion 42 with the splines 46d has the smallest diameter or width.

The second external threads 46c are axially spaced from the first external threads 46b. Thus, the second external threads 46c are located closer to the left free end 42b of the axle portion 42 than the right attached end 42a of the axle portion 42. Preferably, as seen in FIG. 5, the second external threads 46c are spaced inwardly from the splines 46d with the splines 46d being disposed at the free edge of the left free end 42b of the axle portion 42. The left cone 34 has its internal threads 34a that are configured and arranged to threadedly engage the second external threads 46c. Preferably, a lock nut 48 and a washer 49 are installed on the second external threads 46c of the axle portion 42 for securing the left cone 34 on the axle portion 42. Thus, the lock nut 48 has internal threads that are configured and arranged to threadedly engage the second external threads 46c.

The left crank arm portion 44 has an inner end 44a with serrations or splines that are configured and arranged to engage the splines 46d disposed on the outer peripheral surface 46 of the left free end 42b of the axle portion 42. Thus, the left crank arm portion 44 is non-rotatably coupled to the left free end 42b of the axle portion 42 by the splines 46d. In other words, the left crank arm portion 44 has corresponding serrations or splines 44a that mate with the splines 46d formed on left free end 42b of the axle portion 42 to prevent relative rotation.

The left crank arm fastening arrangement 45a engages the internal threads 47a of the inner peripheral surface 47 disposed at the left free end 42b of the axle portion 42 to releasably attach the inner end 44a of the left crank arm portion 44 to the left free end 42b of the axle portion 42. In other words, the left crank arm fastening arrangement 45 engages the internal threads 47a to fixedly retain the left crank arm portion 44 to the left free end 42b of the axle portion 42.

Figure 3B:
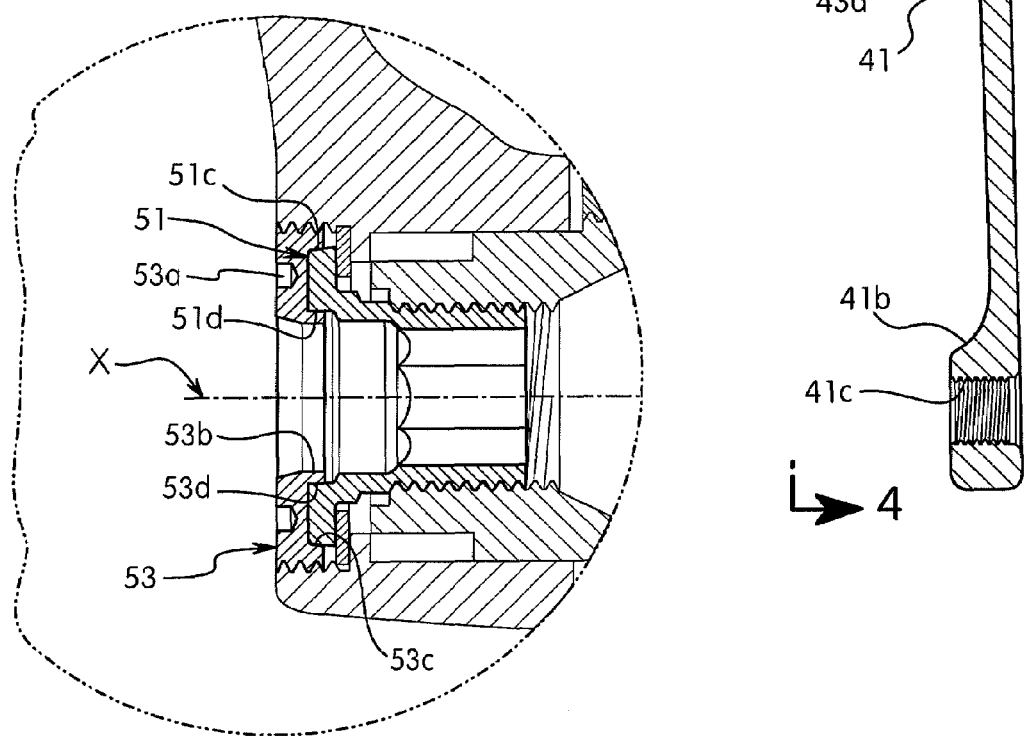
FIG. 3B is an enlarged, partial longitudinal cross-sectional view of the left crank arm fastening arrangement portion of the bicycle chain wheel structure surrounded by a phantom circle in FIG. 3A.
Figure 4:
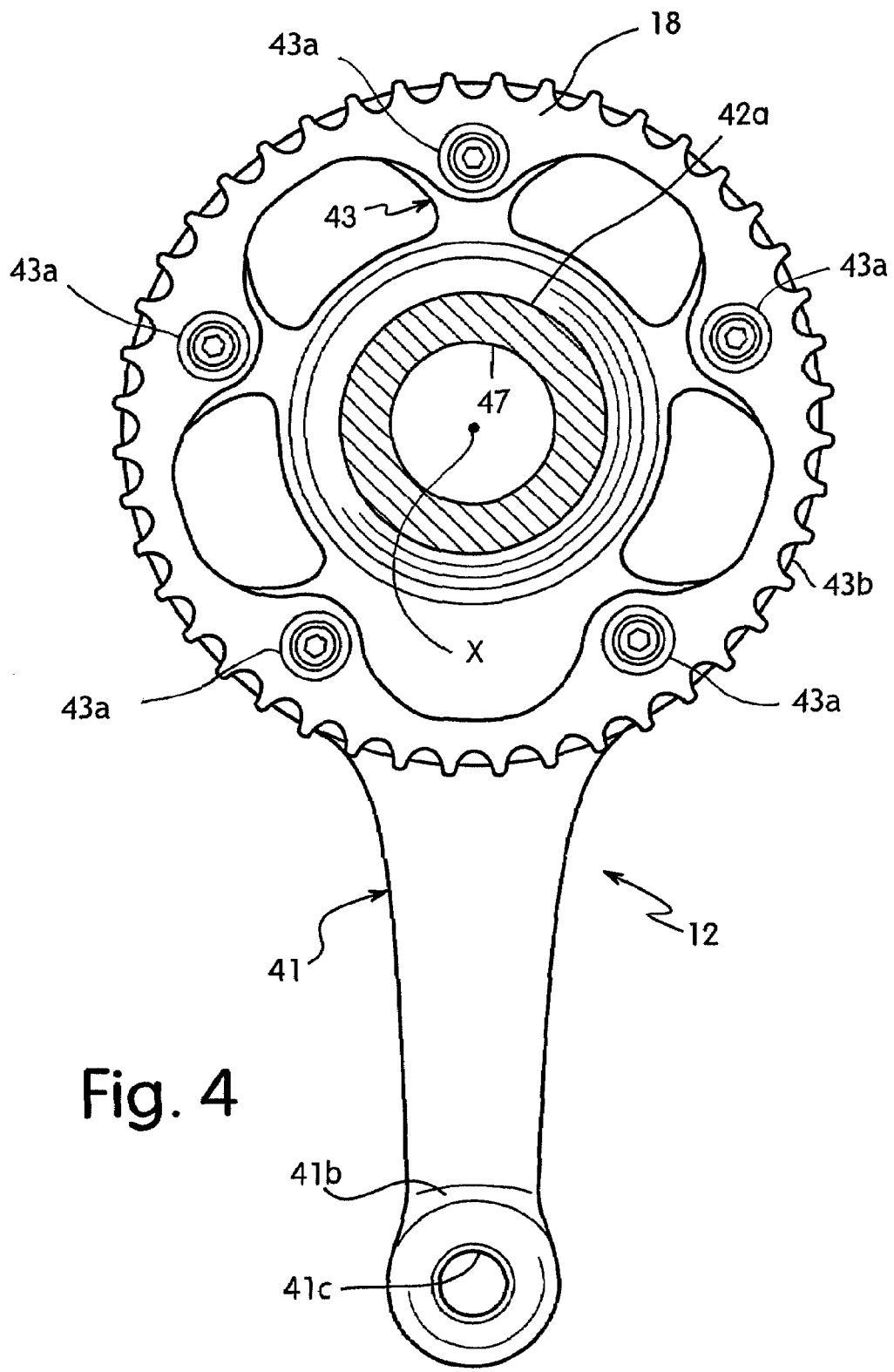
FIG. 4 is a partial transverse cross-sectional view of the bicycle chain wheel structure illustrated in FIGS. 1-3B as seen along section line 4-4 of FIG. 3A.

Preferably, the left crank arm fastening arrangement 45 includes a mounting bolt 51, a washer 52 and a locking ring 53. The mounting bolt 51 has external threads that mate with the internal threads 47a of the left free end 42b of the axle portion 42. Preferably, the mounting bolt 51 is a hollow member with a bore having a torque transmitting surface 51a. The mounting bolt 51 has an annular flange 51b that abuts a flange of the left crank arm portion 44 to apply an axial force that maintains the left crank arm portion 44 on the left free end 42b of the axle portion 42. Preferably, the washer 52 is disposed between the annular flange 51b of the mounting bolt 51 and the left crank arm portion 44. The locking ring 53 is threaded into the left crank arm portion 44 and is configured and arranged to abut the annular flange 51b of the mounting bolt 51. Preferably, the locking ring 53 has a plurality of blind bores 53a that are circumferentially spaced apart for receiving an installation tool. The locking ring 53 also has a central opening 53b. The torque transmitting surface 51a and the central opening 53b are sized so that the torque transmitting surface 51a is engagable through the central opening 53b when the left crank arm fastening arrangement 45 is installed in the internal threads 47a of the left free end 42b of the axle portion 42, as seen in 3. The locking ring 53 includes a first surface 53c facing radially inwardly which is opposed to a first surface 51c facing radially outwardly of the mounting bolt 51. The locking ring 53 further includes a second surface 53d facing radially outwardly which is opposed to a second surface 51d facing radially inwardly of the mounting bolt 51 such that the locking ring 53 covers an axially outwardly facing end surface of the mounting bolt 51 (i.e., the axially outwardly facing free end surface of the annular flange 51b), as seen in FIGS. 3A and 3B.

The chain guard portion 43 is integrally formed with the right crank arm portion 41 such that the chain guard portion 43 is a one-piece, unitary member with the right crank arm portion 41 and the axle portion 42. Preferably, the chain guard portion 43 has a plurality of discrete circumferentially spaced chain wheel attachment structures 43a for securing the chain wheel 18 thereto and a continuous annular ring section 43b disposed radially outwardly of the chain wheel attachment structures 43a, as best seen in FIGS. 2-5. The chain wheel attachment structures 43a are disposed radially outwardly of the axle portion 42. Preferably, the chain wheel attachment structures 43a include a plurality of threaded holes with axes substantially parallel to the rotational axis of the axle portion 42. The annular ring section 43b of the chain guard portion 43 can be clearly seen in FIGS. 2-5 in the area radially outwardly of the cutouts and the chain wheel attachment structures 43a. The radial direction is relative to the rotation or center axis X of the chain wheel structure 12. In other words, the rotation or center axis X of the chain wheel structure 12 extends centrally, longitudinally through the axle portion 42 (i.e., corresponds to the center axis of the axle portion 42). While the chain wheel attachment structures 43a are illustrated with only one chain wheel 18 attached thereto, it will be apparent to those skilled in the art from this disclosure that more than one chain wheels of different sizes can be installed on the chain wheel attachment structures 43a as a cluster of chain wheels without departing from the present invention.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Moreover, terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle chain wheel structure comprising:
    a right crank arm portion having a pedal mounting arrangement;
    an axle portion having a first end integrally formed with the right crank arm portion as a one-piece, unitary member and a second end with a crank arm mounting arrangement, the axle portion having external threads disposed between the first and second ends of the axle portion and an internal bore extending between the first and second ends; and
    a left crank arm detachably, non-rotatably mounted on the second end of the axle portion,
    the crank arm mounting arrangement of the second end of the axle portion including internal threads with a mounting bolt threadedly coupled thereto to axially retain the left crank arm on the second end of the axle portion, and a locking member threadedly coupled to the left crank arm,
    the locking member including a first surface facing radially inwardly which is opposed to a first surface facing radially outwardly of the mounting bolt, and
    the locking member further including a second surface facing radially outwardly which is opposed to a second surface facing radially inwardly of the mounting bolt such that the locking member covers an axially outwardly facing end surface of the mounting bolt.

2. The bicycle chain wheel structure according to claim 1, further comprising
    a chain guard portion and a plurality of discrete circumferentially spaced chain wheel attachment structures integrally formed with the right crank arm portion as a one-piece, unitary member, the chain guard portion having a continuous annular ring section extending around a central axis of the axle portion, the continuous annular ring section being disposed radially outwardly of the discrete circumferentially spaced chain wheel attachment structures.

3. The bicycle chain wheel structure according to claim 2, wherein
the internal threads of the crank arm mounting arrangement of the second end of the axle portion are disposed adjacent a free edge of the second end of the axle portion.

4. The bicycle chain wheel structure according to claim 3, wherein
the crank arm mounting arrangement of the second end of the axle portion includes a plurality of serrations that non-rotatably mate with a plurality of serrations of the left crank arm.

5. The bicycle chain wheel structure according to claim 4, wherein
the serrations of the crank arm mounting arrangement of the second end of the axle portion are disposed on an external surface of the second end of the axle portion.

6. The bicycle chain wheel structure according to claim 5, wherein
the external threads of the axle portion includes a first external threads disposed adjacent the first end of the axle portion and a second external threads disposed adjacent the second end of the axle portion, the second external threads having a smaller outer diameter than the first external threads.

7. The bicycle chain wheel structure according to claim 1, wherein
the crank arm mounting arrangement of the second end of the axle portion includes a plurality of serrations that non-rotatably mate with a plurality of serrations of the left crank arm.

8. The bicycle chain wheel structure according to claim 7, wherein
the serrations of the crank arm mounting arrangement of the second end of the axle portion are disposed on an external surface of the second end of the axle portion.

9. The bicycle chain wheel structure according to claim 1, wherein
the internal threads of the crank arm mounting arrangement of the second end of the axle portion are disposed adjacent a free edge of the second end of the axle portion.

10. The bicycle chain wheel structure according to claim 9, wherein
the crank arm mounting arrangement of the second end of the axle portion includes a plurality of serrations that non-rotatably mate with a plurality of serrations of the left crank arm.

11. The bicycle chain wheel structure according to claim 10, wherein
the serrations of the crank arm mounting arrangement of the second end of the axle portion are disposed on an external surface of the second end of the axle portion.

12. The bicycle chain wheel structure according to claim 1, further comprising
a left cone of a left bearing set threadedly mounted to the second end of the axle portion.

13. The bicycle chain wheel structure according to claim 12, further comprising
a right cone of a right bearing set threadedly mounted to the axle portion adjacent the first end of the axle portion.

14. The bicycle chain wheel structure according to claim 13, wherein
the crank arm mounting arrangement of the second end of the axle portion includes a plurality of external serrations that non-rotatably mate with a plurality of internal serrations of the left crank arm.

15. The bicycle chain wheel structure according to claim 1, wherein
the internal bore of the axle portion having a first section arranged at the first end having a maximum internal diameter of the internal bore, a second section arranged at the second end having a minimum internal diameter of the internal bore and at least one intermediate section arranged between the first and second sections having an intermediate internal diameter of the internal bore, each of the sections of the internal bore being arranged to form a non-conical internal surface along an entire axial length of the internal bore with each of the internal sections decreasing in transverse width as the internal surface approaches the second section from the first section.

16. The bicycle chain wheel structure according to claim 1, wherein
the locking member is a ring shaped member with external threads that threadedly engage the left crank arm.

17. The bicycle chain wheel structure according to claim 16, wherein
the mounting bolt includes a bore having a torque transmitting surface that is sized to be engageable through a central opening of the ring-shaped locking member after the locking member is threadedly coupled to the left crank arm, the torque transmitting surface being disposed at an inner end of the bore that is spaced axially inwardly from the locking member.

18. The bicycle chain wheel structure according to claim 17, wherein
the locking member includes a plurality of blind bores that are circumferentially spaced apart that are configured and arranged to non-rotatably engage an installation tool.

19. The bicycle chain wheel structure according to claim 1, wherein
the mounting bolt includes a torque transmitting surface, the torque transmitting surface and the locking member being arranged and configured such that the torque transmitting surface is engageable after the locking member is threadedly coupled to the left crank arm, the torque transmitting surface being disposed at an inner end of the bore that is spaced axially inwardly from the locking member.

* * * * *